F. M. ANDREWS.
MEANS FOR DRYING AND HEATING SAND, STONE, GRIT, OR OTHER MATERIALS.
APPLICATION FILED MAY 7, 1914.

1,147,203.  Patented July 20, 1915.
6 SHEETS—SHEET 1.

F. M. ANDREWS.
MEANS FOR DRYING AND HEATING SAND, STONE, GRIT, OR OTHER MATERIALS.
APPLICATION FILED MAY 7, 1914.

1,147,203.

Patented July 20, 1915.
6 SHEETS—SHEET 2.

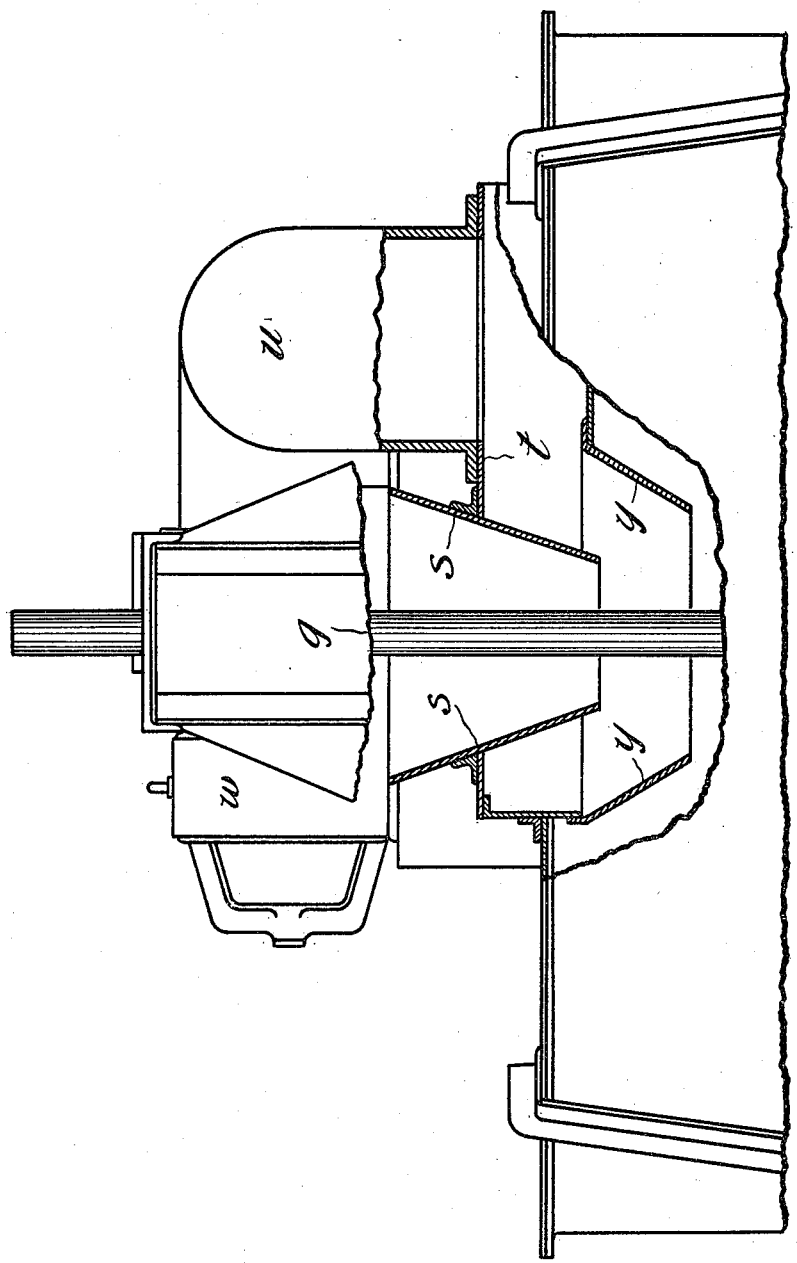

F. M. ANDREWS.
MEANS FOR DRYING AND HEATING SAND, STONE, GRIT, OR OTHER MATERIALS.
APPLICATION FILED MAY 7, 1914.
1,147,203.
Patented July 20, 1915.
6 SHEETS—SHEET 4.
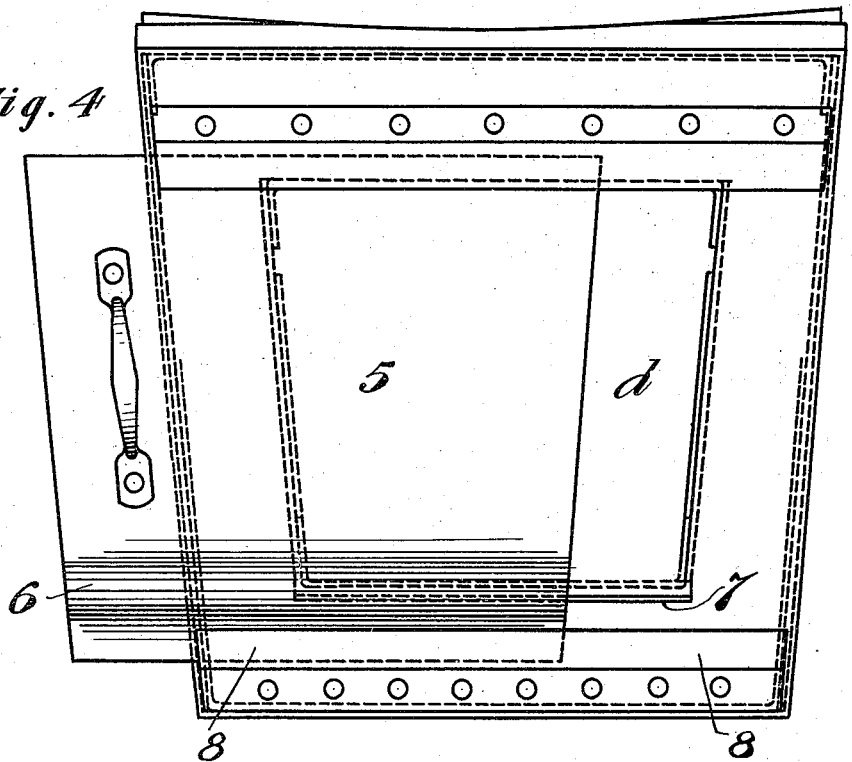
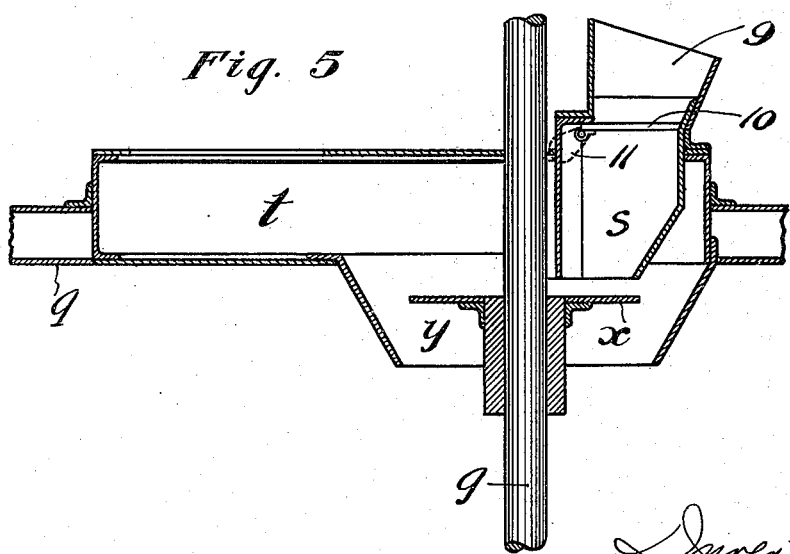

F. M. ANDREWS.
MEANS FOR DRYING AND HEATING SAND, STONE, GRIT, OR OTHER MATERIALS.
APPLICATION FILED MAY 7, 1914.

1,147,203.

Patented July 20, 1915.
6 SHEETS—SHEET 5.

F. M. ANDREWS.
MEANS FOR DRYING AND HEATING SAND, STONE, GRIT, OR OTHER MATERIALS.
APPLICATION FILED MAY 7, 1914.
1,147,203.
Patented July 20, 1915.
6 SHEETS—SHEET 6.
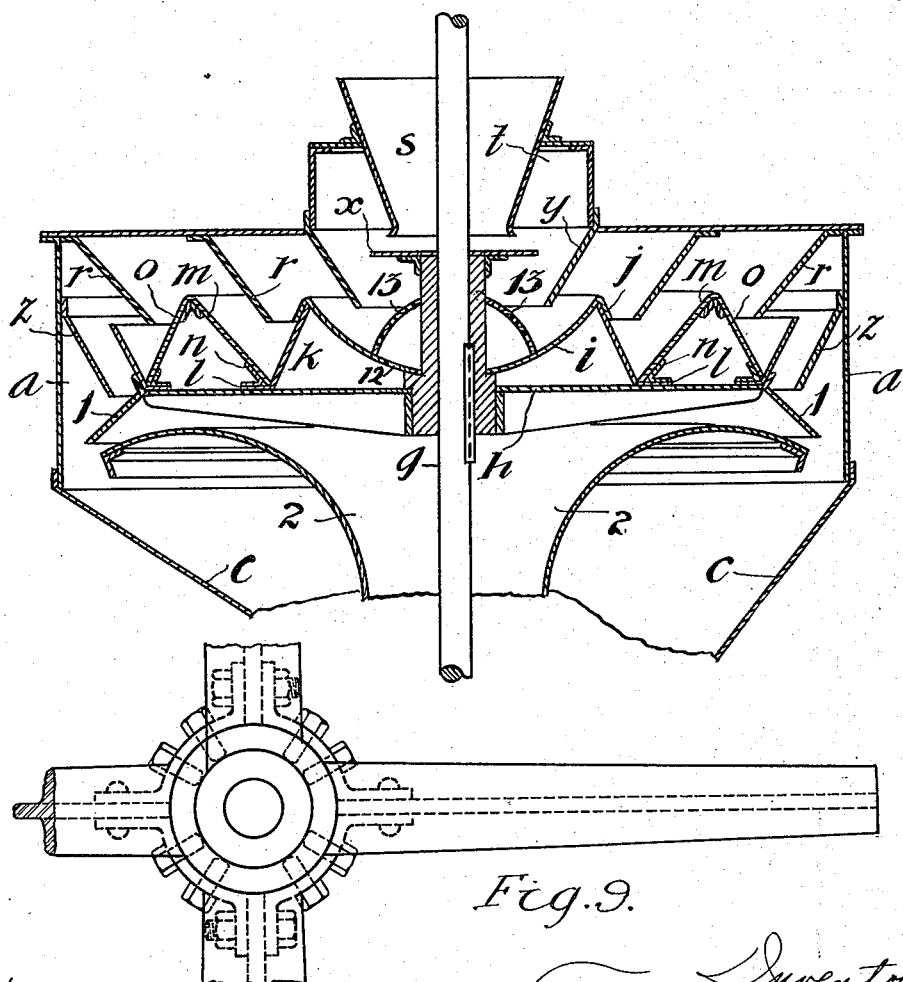

UNITED STATES PATENT OFFICE.

FRANK MILLS ANDREWS, OF LONDON, ENGLAND.

MEANS FOR DRYING AND HEATING SAND, STONE, GRIT, OR OTHER MATERIALS.

1,147,203.

Specification of Letters Patent. Patented July 20, 1915.

Application filed May 7, 1914. Serial No. 837,036.

*To all whom it may concern:*

Be it known that I, FRANK MILLS ANDREWS, a citizen of the United States, and residing at 63 Great Cumberland Place, London, England, have invented a new and useful Improvement in the Means for Drying and Heating Sand, Stone, Grit, or other Materials; and I do hereby declare the following to be a full, clear, and exact description of the same.

This invention comprises improvements in the means for drying and heating sand, stone, grit or other materials.

The improvements have relation to a centrifugal machine for heating and drying materials and embody useful and novel features in the construction of the rotating member or members and in the introduction and distribution of the hot gases or heated air for effecting the drying and heating.

Sand, stone, grit or like materials, when efficiently and cleanly dried and heated to a temperature that will neither burn nor cool and coagulate the binding material, may be compounded or mixed with viscous liquids or materials such as asphalt, bitumen, tar or the like to form a durable, dustless surface for roads and the like. It is more particularly for these purposes that my invention is intended to be used.

The appended drawing illustrates a preferred embodiment of the invention, the further novel features of which will be pointed out in the claims.

Figure 1:
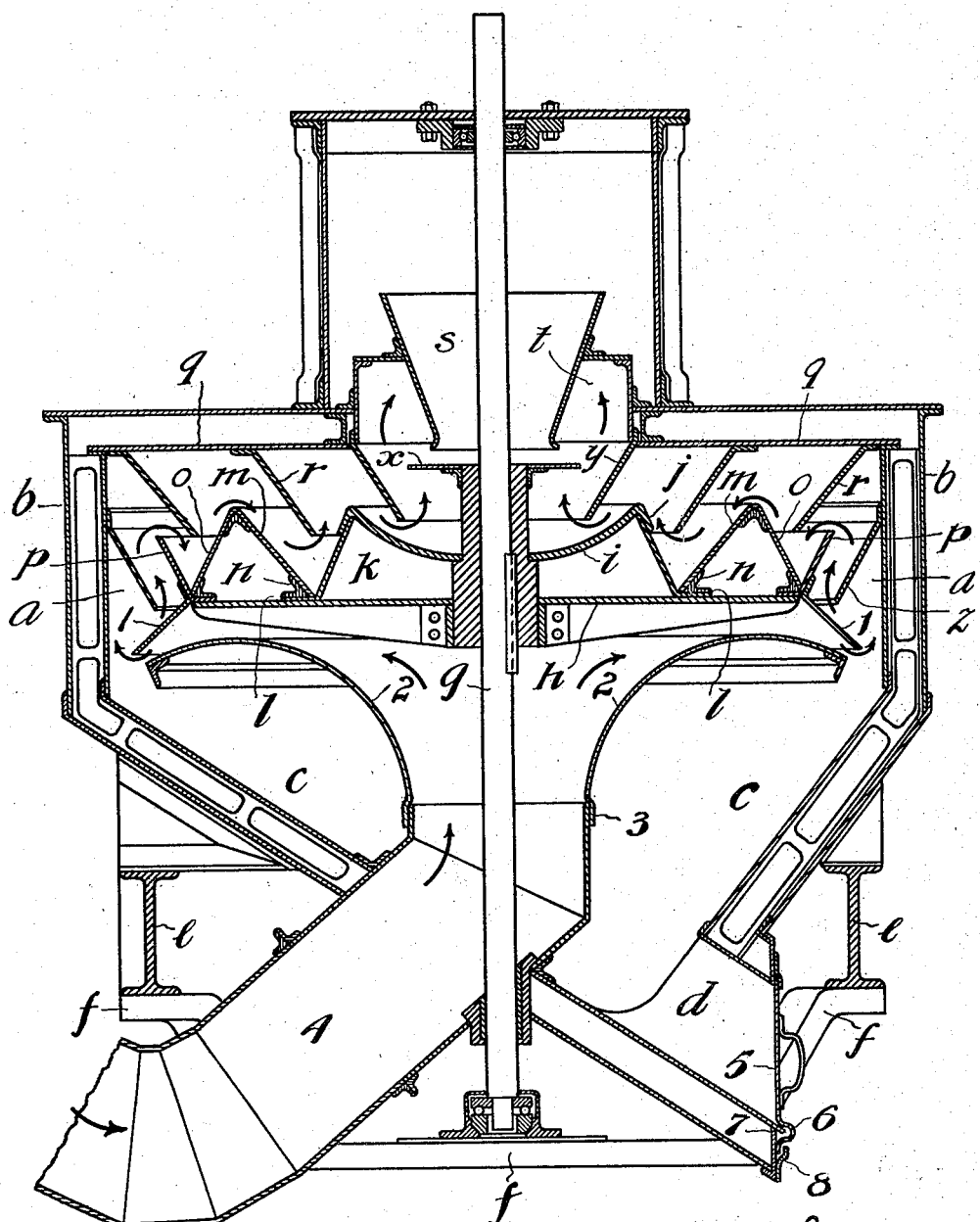
Figure 2:
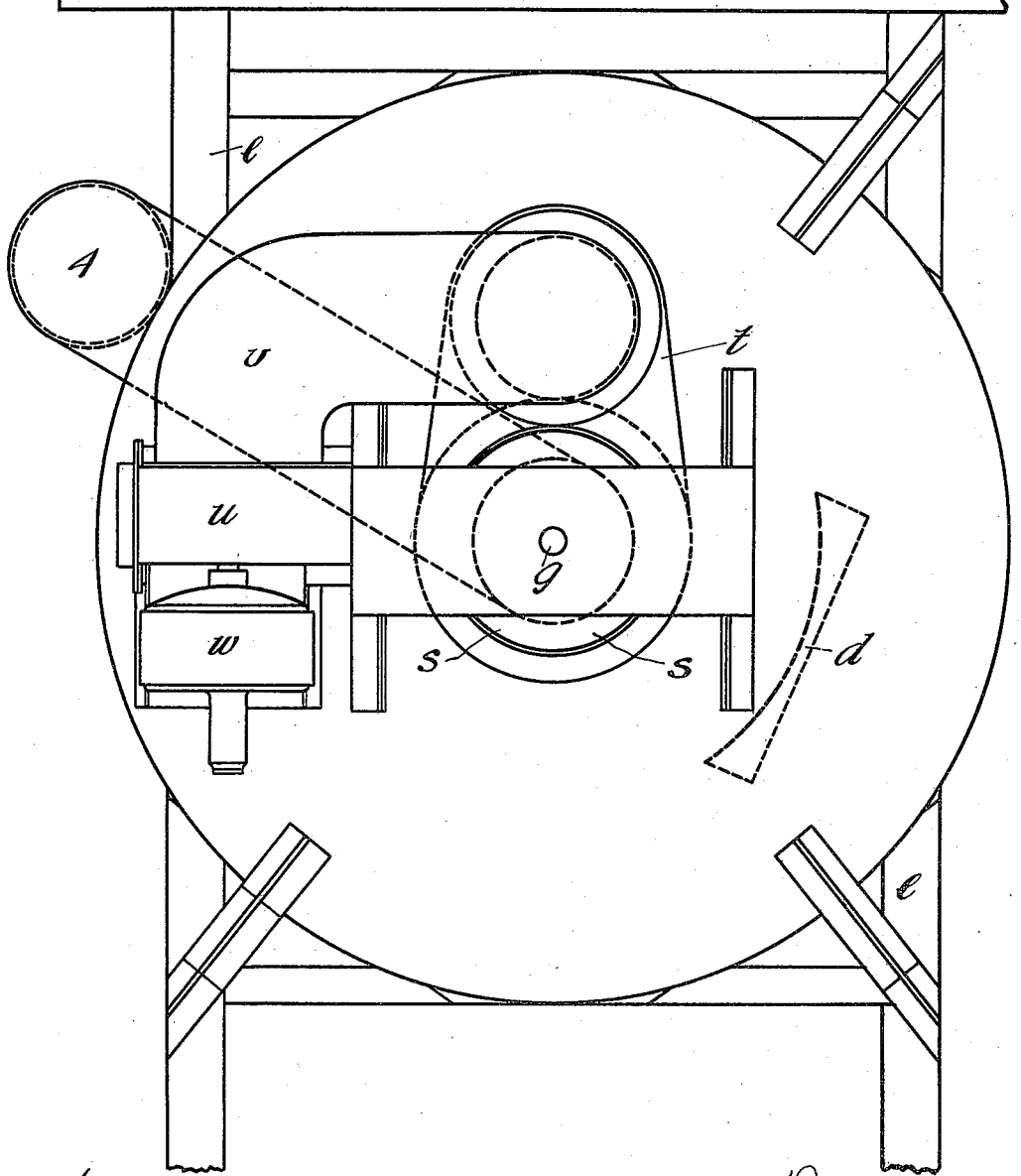

Figure 1 is a vertical sectional view of the apparatus. Fig. 2 is a plan thereof. Fig. 3 is a sectional elevation of the exhaust chamber and the fan connected therewith. Fig. 4 is a detailed view of a convenient discharge door. Fig. 5 is a section and Fig. 6 a side elevation of a modified feed hopper. Fig. 7 is a plan of this modified feed hopper. Fig. 8 shows a further modification. Fig. 9 is a detail view, partly broken away, showing the spider-like support for the corrugated disk.

The apparatus comprises a cylindrical chamber $a$, preferably with a surrounding casing $b$ to permit the provision of adequate heat insulating means to prevent the conduction of heat away from the chamber; for this purpose the empty space between the chamber may suffice or this space may be packed with asbestos or any other heat insulating material. The chamber $a$ terminates in a conical hopper-like bottom $c$ leading to a discharge passage $d$ at one side, and is mounted on a suitable underframing $e$ $f$ so that it may readily be provided with wheels or runners of any kind to render it portable. Centrally in the chamber is arranged a rotary shaft $g$ that may be provided at its upper end with any suitable gear or means so that it may be rotated by a convenient power unit, if desired at more than one speed. Within the chamber $a$ a rotary disk or member $h$ is mounted upon the shaft $g$ and the operative surface of this rotary member $h$ is preferably built up or formed with annular corrugations or waves. As an example the following method is given for obtaining this effect: A dished plate $i$ forms the center part of the corrugated surface and has a flange $j$ by which it is secured to an annular conical plate $k$ which may be pressed in one piece or built up in sections; this plate $k$ is provided with an outwardly directed flange $l$ at the bottom which is secured to the bottom plate or disk $h$ and to the next outwardly inclined annular plate $m$, a stiffening member $n$ being used at this junction if desired. This plate $m$ may be pressed in one piece with the return slope $o$ or secured by a flange to same and may be pressed in one piece as an annular member or may be pressed or built up in sections, say in four sections. The return slope $o$ is connected to a further outwardly inclined plate $p$ and to the bottom plate and the plate $p$ may form the outer perimeter of the operative surface of the rotary member.

The top or closing plate $q$ of the chamber $a$ is provided with annular plates or walls preferably inclined as at $r$, which project downwardly as shown at Fig. 1 and form fixed baffles to receive material thrown off the outward inclines of the rotary member as will be hereafter more fully explained. At the center of the top closing plate $q$ is a central opening and a feeding hopper $s$ is mounted in this position. The opening is closed above to form a chamber $t$ which projects to one side as shown in the plan Fig. 2 and by the section Fig. 3. This chamber forms an exhaust chamber and a fan or pump $u$ is mounted upon supports on the top plate $q$ with a connection $v$ to this chamber $t$; the fan or pump may be driven by a motor or engine $w$ which may also be utilized if desired for operating the rotary shaft.

It is preferred to employ a preliminary disk $x$ on the rotary member below the feed hopper $s$ with a further fixed inclined wall $y$.

Beyond the outer wall or plate $p$ of the rotary member I provide an annular inclined plate or core $z$ secured to the wall of the chamber $a$ to lead material thrown off the plate $p$ onto a downwardly sloped flange or deflector 1 of the rotary member. Below the rotary member I arrange a flared pipe 2 which is connected at 3 to the inlet pipe 4 for hot gases or heated air from any suitable source. This flared pipe preferably terminates at its perimeter close to the edge of the deflector 1 of the rotary plate so that the gases or heated air issue around the edge of that deflector and pass up through the material falling off same.

The discharge outlet $d$ is shown provided with a sliding door 5 which is formed with an outwardly projecting portion 6 to form a recess to permit of an overhang 7 on the bottom plate of the discharge passage so that material discharging through the outlet is shot clear of the grooves or guides 8 of the door to prevent clogging of the guides.

The operation is as follows: Hot gases or heated air will be introduced at the inlet pipe 4 and pass up below the rotary member $h$ heating that member and passing out around the perimeter of the flared pipe 2 under the edge of the deflector 1 on the rotary member. The gases or air then pass up under the plate $z$ and over the plate and up and down over the corrugated operative surface of the rotary member as shown by the arrows at Fig. 1, finally passing up at the center of the apparatus into the chamber $t$ from which they are drawn by the fan $u$ (Fig. 2). The rotary member is rotated and sand, or other material to be treated is thrown in through the hopper $s$ onto the preliminary disk $x$ whence it is thrown off by centrifugal force and impinges on the fixed baffle $y$ which breaks it up or separates its component particles or pieces and these fall onto the dished plate $i$. During this time the material has been subjected to the hot gases or heated air and any steam or moisture driven off the material is carried away to the exhaust chamber. From the plate $i$ the material is thrown against the fixed baffles $r$ and falls into the next corrugation of the rotary member and under centrifugal force climbs the wall $m$ striking a further baffle $r$ and finally climbing the plate $p$ and being thrown off against the plate $z$ onto the rotating deflector 1 on escaping off which it is subjected to the action of the hot gases or heated air, escaping from the flared chamber before it passes into the hopper $c$. While in the hopper $c$ the material is kept hot by the heat from the flared pipe 2. As required for use the material is withdrawn at $d$.

It will be seen that during its passage through the apparatus the material is repeatedly thrown against the fixed baffle surface while exposed to the hot gases or heated air and as the fixed baffles $r$ depend from the fixed flat top plate $q$ the material at whatever angle it is flung must strike a fixed surface while under the influence of the force and is thus efficiently broken up or separated and a very rapid drying and heating is the result.

It will be understood that any convenient closing device may be employed for the feed hopper $s$ if a closure is found desirable.

Figure 6:
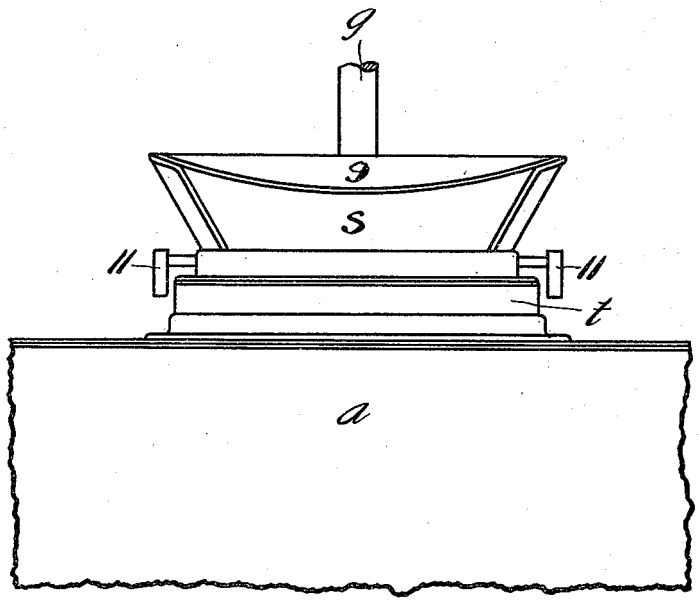
Figure 7:
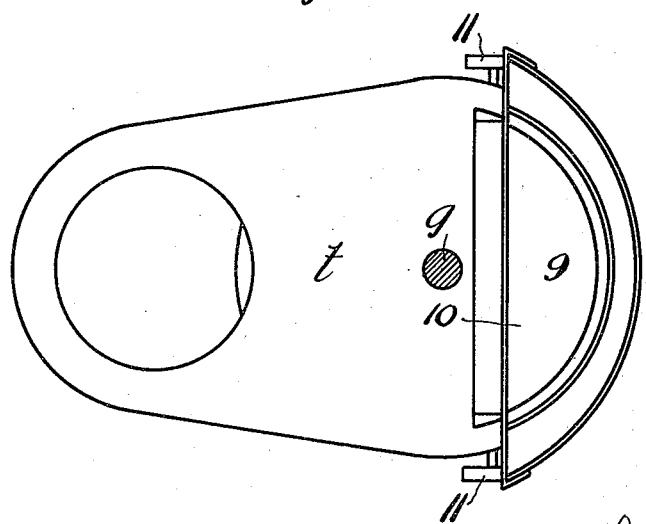

At Figs. 5, 6, and 7 is shown a modified arrangement of the feeding hopper $s$. In this case it is disposed to one side of the rotary shaft $g$ and its mouth is at an angle to the horizontal to facilitate charging of the material into the apparatus if this is done by hand labor. A closure plate 10, with counterweights 11 is hinged in the throat of the hopper to prevent the ingress of cold air. The disk $x$ baffle $y$ and exhaust chamber $t$ are as before.

In order to increase the drying and heating effect at the point of entry of the material into the apparatus with the object of driving off the bulk of the moisture before the material progresses far into the apparatus the arrangement shown at Fig. 8 may be followed. In this case pipes or passages such as 12 are provided through the rotary member and on the upper surface a perforated distributing plate or grid 13 is used. The pipe or pipes 12 are relatively small to the volume of the heated air or gas inlet so that the main body of the heating medium has to pass along the complete path traveled by the material to be treated but in the reverse direction.

I claim:

1. An apparatus for drying and heating material comprising in combination, a casing, a bottom for said casing provided with an outlet, a closing top plate for said casing, a rotary shaft with a rotary disk member thereon, said shaft and disk being located within said casing, an inlet conduit for hot gases or heated air, said conduit entering said casing and opening below said rotary member, and means for driving the said rotary shaft and member.

2. Apparatus for drying and heating material comprising a casing or body, a bottom to said casing provided with an outlet, a closing top plate for said casing, plates or baffles depending from said closing plate, a rotary shaft with a rotary member thereon, said shaft and said rotary member located within said casing, annular plates or walls projecting upwardly and outwardly from said rotary member, an inlet passage for hot gases or heated air, said passage entering said casing and opening below said rotary member, together with means permitting the material to be treated to be charged into the apparatus and for driving the said rotary shaft and member.

3. Apparatus for drying and heating material comprising a casing or body, a bottom to said casing provided with an outlet, a closing top plate for said casing, plates or baffles depending from said closing plate, said plates or baffles being annular and inclined from the closing plate toward the center of the apparatus, a rotary shaft with a rotary member thereon, said shaft and rotary member located within said casing, annular plates or walls projecting upwardly and outwardly from said rotary member, an inlet passage for hot gases or heated air, said passage entering said casing and opening below said rotary member, together with means permitting the material to be treated to be charged into the apparatus and for driving the said rotary shaft and member.

4. Apparatus for drying and heating material comprising a casing or body, a bottom to said casing provided with an outlet, a closing top plate for said casing, plates or baffles depending from said closing plates, said plates or baffles being annular and inclined from the closing plate toward the center of the apparatus, an opening at the center of said closing plate and an exhaust chamber above said opening with a fan communicating with said chamber, a rotary shaft with a rotary member thereon, said shaft and rotary member located within said casing, annular plates or walls projecting upwardly and outwardly from said annular member, an inlet passage for hot gases or heated air, said passage entering said casing and opening below said rotary member; together with means permitting the material to be treated to be charged into the apparatus and for driving the said rotary shaft and member.

5. Apparatus for drying and heating material comprising a casing or body, a bottom to said casing provided with an outlet, a closing top plate for said casing, plates or baffles depending from said closing plates, said plates or baffles being annular and inclined from the closing plate toward the center of the apparatus, an opening at the center of said closing plate and an exhaust chamber above said opening with a fan communicating with said chamber, a rotary shaft with a rotary member thereon, said shaft and rotary member located within said casing, annular plates or walls projecting upwardly and outwardly from said annular member, an inlet passage for hot gases or heated air, said passage entering said casing, an opening below said rotary member together with means permitting the material to be treated to be charged into the apparatus, said means comprising a feed hopper passing through said exhaust chamber, and means for driving the said rotary shaft and member.

6. Apparatus for drying and heating material comprising a casing or body, a bottom to said casing provided with an outlet, a closing top plate for said casing, plates or baffles depending from said closing plates, said plates or baffles being annular and inclined from the closing plate toward the center of the apparatus, an opening at the center of said closing plate and an exhaust chamber above said opening with a fan communicating with said chamber, a rotary shaft with a rotary member thereon, said shaft and rotary member located within said casing, annular plates or walls projecting upwardly and outwardly from said rotary member, an inlet passage for hot gases or heated air, said passage entering said casing, an opening below said rotary member, together with means permitting the material to be treated to be charged into the apparatus, said means comprising a feed hopper passing through said exhaust chamber, a counterweight closure plate in said hopper, and means for driving the said rotary shaft and member.

7. Apparatus for drying and heating material comprising a casing or body, a bottom to said casing provided with an outlet, a closing top plate for said casing, plates or baffles depending from said closing plates, said plates or baffles being annular and inclined from the closing plate toward the center of the apparatus, an opening at the center of said closing plate and an exhaust chamber above said opening with a fan communicating with said chamber, a rotary shaft with a rotary member thereon, said shaft and rotary member located within said casing, annular plates or walls projecting upwardly and outwardly from said rotary member, an inlet passage for hot gases or heated air, said passage entering said casing, and opening below said rotary member, together with means permitting the material to be treated to be charged into the apparatus, said means comprising a feed hopper passing through said exhaust chamber, together with a preliminary rotating disk immediately below said hopper and mounted on the rotary shaft and with a fixed baffle surrounding said preliminary disk; and means for driving the said rotary shaft and member.

8. Apparatus for drying and heating materials comprising a cylindrical casing or body, a bottom to said casing provided with an outlet, said bottom being of conical hopper form inclining toward said outlet, a sliding closing plate for said outlet with a troughed part formed across it, said bottom having an overhanging edge at said outlet, which overhanging edge is accommodated in said trough, a closing top plate for said casing, a rotary shaft with a rotary member thereon, said shaft and member located within said casing, an inlet passage for hot gases or heated air, said passage entering said casing and opening below said rotary member; together with means permitting the material to be treated to be charged into the apparatus, said means comprising a hopper arranged to feed material through a central opening formed in said closing top plate.

9. Apparatus for drying and heating material comprising a cylindrical casing or body, a bottom to said casing provided with an outlet, a closing top plate for said casing, plates or baffles depending from said closing plate, a rotary shaft with a rotary member thereon, said shaft and member located within said casing, annular plates or walls projecting upwardly and outwardly from said member, said plates or walls being connected by oppositely inclined plates to form a corrugated operative surface upon said rotary member, an inlet passage for hot gases or heated air, said passage entering said casing and opening below said rotary member; together with means permitting the material to be treated to be charged into the apparatus and for driving the said rotary shaft and member.

10. Apparatus for drying and heating materials comprising a cylindrical casing or body, a bottom to said casing provided with an outlet, a closing top plate for said casing, plates or baffles depending from said closing plate, a rotary shaft with a rotary member thereon, said shaft and rotary member located within said casing, a dished plate above the center of said member and annular plates or walls projecting upwardly and outwardly from said member, an oppositely inclined annular plate connecting the perimeter of said dished plate with the lower part of the first of said upwardly and outwardly projecting plates or walls, a further oppositely inclined plate connecting the upper edge of the said first of said upwardly and outwardly projecting plates to the lower part of the second of said plates; an inlet passage for hot gases or heated air, said passage entering said casing and opening below said rotary member; together with means permitting the material to be treated to be charged into the apparatus and for driving the said rotary shaft and member.

11. Apparatus for drying and heating materials comprising a casing or body, a bottom to said casing provided with an outlet, a closing top plate for said casing, a rotary shaft with a rotary member thereon, said shaft and member located within said casing, an inlet passage for hot gases or heated air, said passage entering said casing through the bottom and passing upwardly toward the underside of the said rotary member, said passage, as it approaches said rotary member, being outwardly flared, the perimeter of the flared part finishing adjacent to the perimeter of said rotary member; together with means permitting the material to be treated to be charged into the apparatus and for driving the said rotary shaft and member.

12. Apparatus for drying and heating materials comprising a cylindrical casing or body and a conical hopper bottom part thereto provided with a controlled outlet, a closing top plate for said casing, a rotary shaft with a rotary member thereon, said shaft and rotary member being located with said casing, an inlet passage for hot gases or heated air, said passage entering said casing through the bottom and passing up through said hopper portion toward the underside of the said rotary member, said passage as it approaches said rotary member being outwardly flared, the perimeter of the flared part finishing adjacent the perimeter of said rotary member; together with means permitting the material to be treated to be charged into the apparatus and for driving the said rotary shaft and member.

13. Apparatus for drying and heating materials comprising a cylindrical casing or body and a conical hopper bottom part thereto provided with a controlled outlet, a closing top plate for said casing, a rotary shaft with a rotary member thereon, said shaft and rotary member being located within said casing, and said rotary member having a downwardly and outwardly inclined deflector at its perimeter, an inlet passage for hot gases or heated air, said passage entering said casing through the bottom and passing up through said hopper portion toward the underside of the said rotary member, said passage as it approaches said rotary member, being outwardly flared, the perimeter of the flared part finishing adjacent to the perimeter of the said deflector.

14. Apparatus for drying and heating materials comprising a cylindrical casing or body finishing in a conical hopper part provided with an outlet, a closing top plate for said casing, plates or baffles depending from said closing plate, a rotary shaft with a rotary member mounted thereon, said shaft and rotary member located within said casing, annular plates or walls projecting upwardly and outwardly from said rotary member, said plates or walls being connected by oppositely inclined plates to form a corrugated operative surface for said rotary member, an inlet passage for hot gases or heated air, said passage entering said casing through the bottom and passing up through said hopper portion toward the underside of said rotary member, said passage as it approaches said rotary member being outwardly flared, the perimeter of the flared part finishing adjacent to the perimeter of said rotary disk member, together with means permitting material to be treated to be charged into the apparatus upon said rotary disk member and with means for driving said rotary shaft.

15. Apparatus for drying and heating materials comprising a cylindrical casing or body finishing in a conical hopper part provided with an outlet, a closing top plate for said casing, plates or baffles depending from said closing plate, a rotary shaft with a rotary member thereon, said shaft and rotary member located within said casing, a dished plate above the center of said member and annular plates or walls projecting upwardly and outwardly from said member, an oppositely inclined annular plate connecting the perimeter of said dished plate with the lower part of the first of said upwardly and outwardly projecting plates or walls, a further oppositely inclined plate connecting the upper edge of the said first of the said upwardly and outwardly projecting plates to the lower part of the second of said plates; an inlet passage, said passage entering said casing through the bottom and passing up through said hopper portion toward the underside of said rotary member, said passage as it approaches said rotary member being outwardly flared, the perimeter of the flared part finishing adjacent to the perimeter of said rotary disk member, together with means permitting material to be treated to be charged into the apparatus upon said rotary disk member and with means for driving said rotary shaft.

16. Apparatus for drying and heating materials comprising a cylindrical casing or body finishing in a conical hopper part provided with an outlet, a closing top plate for said casing, plates or baffles depending from said casing plate, a rotary shaft with a rotary member mounted thereon, said shaft and rotary member located within said casing, a dished plate above the center of said member and annular plates or walls projecting upwardly and outwardly from said member, an oppositely inclined annular plate connecting the perimeter of said dished plate with the lower part of the first of said upwardly and outwardly projecting plates or walls, a further oppositely inclined plate connecting the upper edge of the said first of the said upwardly and outwardly projecting plates to the lower part of the second of said plates, a conical plate secured to the walls of said casing beyond the final outwardly inclined plate of said rotary member, a downwardly inclined plate or deflector at the perimeter of said rotary member and below the bottom of said conical plate secured to the wall of said casing, so that material is guided into said deflector by the conical plate; an inlet passage for hot gases or heated air, said passage entering said casing through the bottom and passing up through said hopper portion toward the underside of said rotary member, said passage as it approaches said rotary member being outwardly flared, the perimeter of the flared part finishing adjacent to the perimeter of said deflector provided on the rotary disk member, together with means permitting the material to be treated to be charged into the apparatus upon said rotary disk member and with means for driving said rotary shaft.

17. Apparatus for drying and heating materials comprising a cylindrical casing or body finishing in a conical hopper part provided with an outlet, a closing top plate for said casing, plates or baffles depending from said closing plate, a rotary shaft with a rotary member mounted thereon, said shaft and rotary member located within said casing, a dished plate above the center of said member and annular plates or walls projecting upwardly and outwardly from said member, an oppositely inclined annular plate connecting the perimeter of said dished plate with the lower part of the first of said upwardly and outwardly projecting plates or walls, a further oppositely inclined plate connecting the upper edge of the said first of the said upwardly and outwardly projecting plates to the lower part of the second of said plates: an inlet passage for hot gases or heated air, said passage entering said casing through the bottom and passing up through said hopper portion toward the underside of said rotary member, said passage as it approaches said rotary member being outwardly flared, the perimeter of the flared part finishing adjacent to the perimeter of said rotary disk member, together with means for permitting material to be treated to be charged into the apparatus, said means comprising a feed hopper passing through a central opening in said closing plate and delivering into the rotary member, and with means for driving the rotary shaft.

18. Apparatus for drying and heating materials comprising in combination, a cylindrical casing finishing in a hopper bottom portion, a closing top plate for said chamber with a central opening, an exhaust chamber above said opening with suction means such as a fan applied thereto, a feed hopper arranged through said exhaust chamber and delivering through said central opening, a rotary shaft in said casing with rotary member thereon, inclined plates depending from the closing top plate and inclined plates projecting up from the rotary member and connected by oppositely inclined plates to form a corrugated operative surface for said rotary member, a dished central plate above said rotary member forming part of said operative surface, a preliminary disk above said dished plate and immediately below said feed hopper, and a conical fixed baffle plate surrounding said preliminary disk and leading to said dished plate, a conical plate on the casing wall beyond the final upwardly inclined plate in the rotary member, said conical plate leading to a downwardly outwardly inclined deflector on the perimeter of the rotary member, an inlet passage for the introduction of hot gases or heated air, said passage entering the bottom of the casing and passing up said conical hopper part toward the rotary member, a flared upper part to said inlet passage extending below said member, the perimeter of said flare being disposed immediately below the perimeter of said deflector, with means for driving the shaft and exhausting means, and a discharge outlet from the hopper bottom portion.

19. Apparatus for drying and heating materials comprising a casing or body, a bottom to said casing provided with an outlet, a closing top plate for said casing, a rotary shaft with a rotary member thereon, said shaft and member located within said casing, an inlet passage for hot gases or heated air, said passage entering said casing and opening below said rotary member, means for passing part of the hot gases or heated air from said inlet passage through the rotary member; together with means permitting the material to be treated to be charged into the apparatus and for driving the said rotary shaft and member.

20. Apparatus for drying and heating materials comprising a casing or body, a bottom to said casing provided with an outlet, a closing top plate for said casing, a rotary shaft with a rotary member thereon, said shaft and member located within said casing, an inlet passage for hot gases or heated air, said passage entering said casing and opening below said rotary member, means for passing part of the hot gases or heated air from said inlet passage through the rotary member, said means comprising a passage through said rotary member and perforated distributer above said passage on the upper surface of said rotary disk member, together with means permitting the material to be treated to be charged into the apparatus and for driving the said rotary shaft and member.

21. Apparatus for drying and heating material comprising in combination a cylindrical casing finishing in a hopper bottom portion, a closing top plate for said chamber with a central opening, an exhaust chamber above said opening with suction means such as a fan applied thereto, a feed hopper arranged through said exhaust chamber and delivering through said central opening, a rotary shaft in said casing with a rotary member thereon, inclined plates depending from the closing top plate and inclined plates projecting up from the rotary member and connected by oppositely inclined plates to form a corrugated operative surface for said rotary member, a dished central plate above said rotary member forming part of said operative surface, a preliminary disk above said dished plate and immediately below said feed hopper and a conical fixed baffle plate surrounding said preliminary disk and leading to said dished plate, a conical plate on the casing wall beyond the final upwardly inclined plate in the rotary member, said conical plate leading to a downwardly outwardly inclined deflector on the perimeter of the rotary member, an inlet passage for the introduction of hot gases or heated air, said passage entering the bottom of the casing and passing up said conical hopper part toward the rotary member, a flared upper part to said inlet passage extending below said member, the perimeter of said flare being disposed immediately below the perimeter of said deflector, with means for passing part of the hot gases or heated air from said inlet passage through the rotary member.

22. Apparatus for drying and heating material comprising in combination a cylindrical casing finishing in a hopper bottom portion, a closing top plate for said chamber with a central opening, an exhaust chamber above said opening with suction means such as a fan applied thereto, a feed hopper arranged through said exhaust chamber and delivering through said central opening, a rotary shaft in said casing with rotary member thereon, inclined plates depending from the closing top plate and inclined plates projecting up from the rotary member and connected by oppositely inclined plates to form a corrugated operative surface for said rotary member, a dished central plate above said rotary member forming part of said operative surface, a preliminary disk above said dished plate and immediately below said feed hopper and a conical fixed baffle plate surrounding said preliminary disk and leading to said dished plate, a conical plate on the casing wall beyond the final upwardly inclined plate in the rotary member, said conical plate leading to a downwardly outwardly inclined deflector on the perimeter of the rotary member, an inlet passage for the introduction of hot gases or heated air, said passage entering the bottom of the casing and passing up said conical hopper part toward the rotary member, a flared upper part to said inlet passage extending below said member, the perimeter of said flare being disposed immediately below the perimeter of said deflector, with means for passing part of the hot gases or heated air from said inlet passage through the rotary member, said means comprising a perforation of the dished plate of said rotary member, and a perforated distributer on the upper surface of said dished plate above said perforation.

23. An apparatus for drying and heating material comprising in combination, a casing, a bottom for said casing provided with an outlet for the dried material, a closing top plate for said casing, a rotary shaft with a rotary disk member thereon, said shaft and disk being located within said casing, an inlet conduit for hot gases or heated air, said conduit entering said casing and passing upwardly therein to a point centrally beneath said rotary disk member, and means for driving the said rotary shaft and member.

24. An apparatus for drying and heating material comprising in combination, a casing, a bottom for said casing provided with an outlet for dried material, a closing top plate for said casing, a rotary shaft with a rotary disk member thereon, said shaft and disk being located within said casing, an inlet conduit for hot gases or heated air, said conduit entering said casing and passing upwardly therein to a point immediately below the center of said rotary disk and then flaring outwardly and discharging at the outer edge of said disk member.

In testimony whereof I affix my signature in presence of two witnesses.

FRANK MILLS ANDREWS.

Witnesses:
JAMES RICHARDS,
GILBERT BRETTELL.

Copies of this patent may be obtained for five cents each, by addressing the "Commissioner of Patents, Washington, D. C."